Dec. 11, 1951
C. H. BARNARD
2,578,280
TUBING BUNDLE OR CLUSTER
Filed May 18, 1950
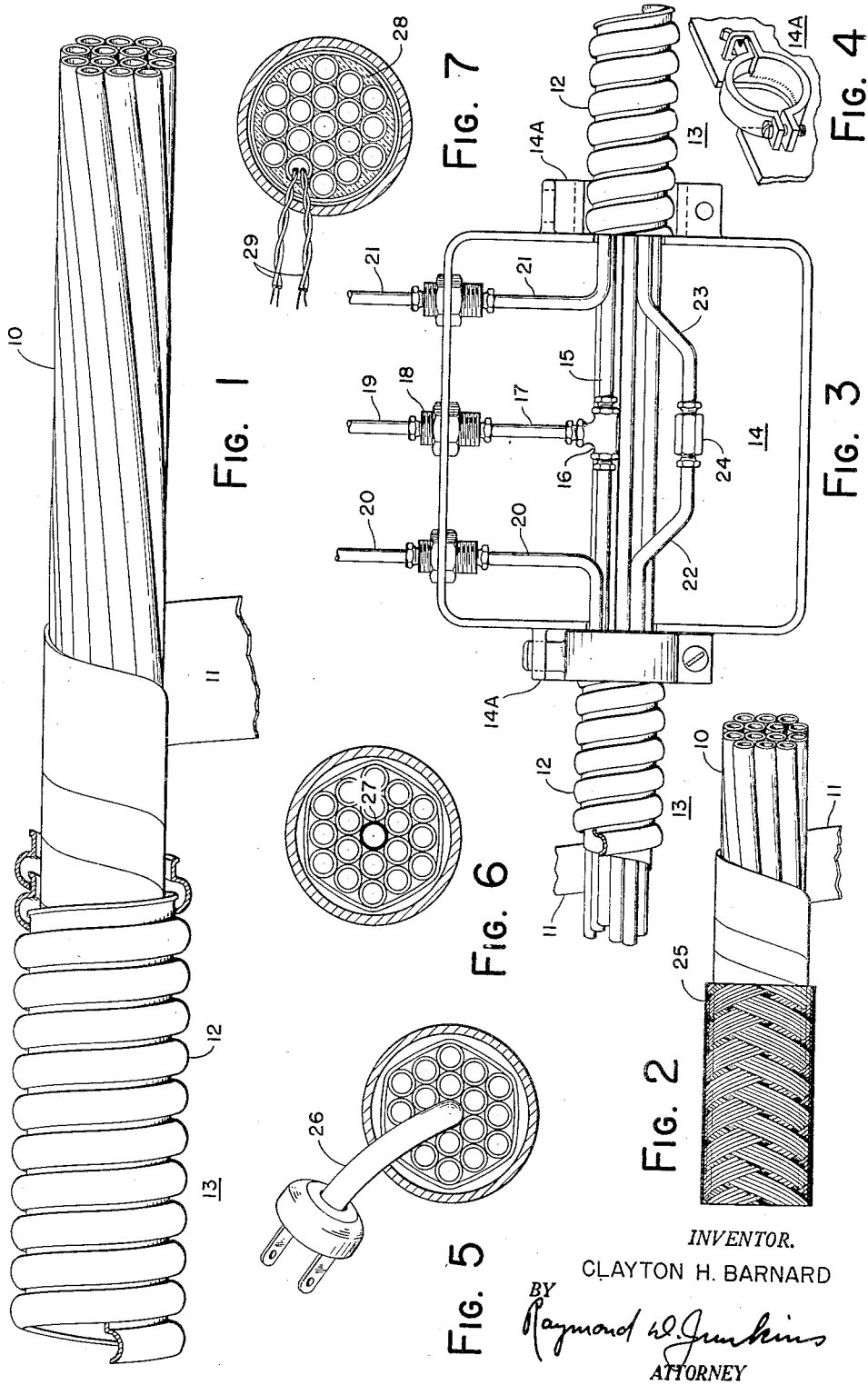
INVENTOR.
CLAYTON H. BARNARD
BY
Raymond W. Jenkins
ATTORNEY Patented Dec. 11, 1951

2,578,280

UNITED STATES PATENT OFFICE 2,578,280

TUBING BUNDLE OR CLUSTER

Clayton H. Barnard, South Euclid, Ohio, assignor to Bailey Meter Company, a corporation of Delaware Application May 18, 1950, Serial No. 162,784

6 Claims. (Cl. 174—95)

This invention relates to an article of manufacture and specifically to a semi-flexible conduit bundle assembly.

In the metering and control art it is common to use many control pressures or fluid flows to transmit signals, control impulses, or measurements between instruments and/or regulators. Usually the pressure to be transmitted is in the relatively low pressure range of 0–50 p. s. i. and may be a pneumatic of hydraulic fluid pressure. Relatively thin-wall tubing may be used and it is customary to use soft annealed copper or aluminum both for ease in forming and to allow the use of flared or other type of compression fittings.

In some installations the number of such control lines is great and the problem of support and protection is a major one. For example, an oil refinery of the catalytic cracking type may have one or more very high towers with numerous desirable points of measurement and/or control of level, temperature, pressure, flow, etc. Such a tower may be from 100 to 300 ft. in height and pressure values are obtained at numerous locations along its height as well as values of flow and other variable conditions. A central metering and control house is usually provided wherein the receiving controllers are located on panel boards adequately protected from the weather and grouped to be readily visible by an operator. Close supervision would not be possible if they were scattered throughout the entire plant without central grouping.

Desirable centralization, however, means that considerable distances must be spanned by tubing to take the various measurements to the control house and to transmit control impulses to various points of regulation. Frequently there are as many as 500 or more relatively small control pipes going from such a control house, and as many as 50 or 100 such pipes may go a distance of 200 ft. or more before they begin to fan out to various individual points of measurement or control.

The problem of properly locating, supporting and protecting these large quantities of relatively small pipes over considerable distance is one that has received a great deal of attention without previously obtaining a satisfactory solution.

Leaving the control house, the numerous pipes are usually of, say, ¼" O. D. to ½" O. D. soft annealed, relatively thin-wall copper tubing or aluminum tubing, and these must be supported at comparatively short distances to provide against sagging to form pockets where moisture may collect, etc. Furthermore, they are usually elevated between the controlhouse and a cracking tower so as not to interfere with trucks, pedestrians, etc., and to prevent damage. This means they have had to have a structural steel runway support of some sort from which the several hundred small control pipes may be individually mounted and supported every 8 ft. or closer. It is readily seen that the complication and expense is great.

Similar problems occur within power plants and process plants as well as in submarines and other marine structures where space is at a minimum and where it is not feasible to individually support and mount the various control and measuring pipes.

A particular object of my invention is to provide as an article of manufacture a bundled or preformed cluster of relatively small pipes or conduits which in its manufactured finality is of a semi-rigid or semi-flexible nature. By this I mean that while it is quite rigid in relatively short lengths, as the lengths become greater it becomes more flexible in that it can be reeled to diameters of 6–10 ft. readily for transportation. Furthermore it permits bending around corners at a fairly small radius to eliminate the necessity of joints or joining.

A further object of my invention is to provide as an article of manufacture, a bundled or clustered collection of small tubing together with electrical conductors such as insulated wires.

Another object of the invention is to provide as an article of manufacture a relatively self-supporting accumulation of metering and control piping and wiring in unitary combination for common support and protection.

In the drawings:

Fig. 1 is an elevation of the preferred form for the article of manufacture with certain portions broken away for sake of explanation.

Fig. 2 illustrates a variation of the outer protecting cover of Fig. 1.

Fig. 3 illustrates a junction point structure for conduits.

Fig. 4 illustrates a clamp for securing the junction structure to the article.

Figs. 5, 6 and 7 illustrate cross-sections of the article showing variations of arrangement with additional features.

I have chosen to illustrate as a preferred embodiment of my invention the association into a bundle of, say, 14 to 20, ¼" O. D. thin-wall copper tubes which are soft annealed, so that they may be readily bent or flared, and remain capable of carrying static pressures in the range of 0 to 50 p. s. i. This is the type of tubing which might normally be used in transmitting pneumatic control pressure variations from a control house to a point of regulation. The distance may be in the nature of 50 ft. to 100 ft., or even greater, and the number of tubes going a major distance before fanning out may be 10 or more and, in fact, of considerable number. I have found that the most commercially salable article is one which has combinations of say 4, 8, 12 or 16 tubes in the structure. Excessively more than that makes the article difficult to manufacture and handle. It is contemplated that if one has an application for 10 tubes, a 12 tube article would be purchased, providing 2 spares for future use.

In Fig. 1 I indicate to actual size the article as including 14 ¼" O. D. thin-wall copper tube elements fabricated by a machine into a bundle whose elements engage each other and form a gentle helix about a common center which serves the purpose of associating the tubes with compactness such that the interstices assume a shape and size providing a minimum greatest diameter of their bundle or cluster. The long, slow helix described by each element tends to hold the bundle gathered up to prevent any one or more of the tubes sagging below the others. The sharpness of the helix each element describes is not critical although the resulting twist of the cluster as a whole can conceivably become too tight and deform the cross-sections of the elements.

As the tubes pass through the fabricating machine (from right to left in Fig. 1) the bundle 10 is tightly wrapped by a spiral wrapping 11 of tape-like form which may be an impregnated cloth, plastic or any flexible wrapping material serving the purpose of closely binding the bundle together to retain its shape. Of course, should it be desirable, wrapping material may be provided with heat or moisture insulating properties, or the wrap 11 may be omitted.

As cluster 10, wrapped with tape 11, progresses through the machine it is next given a metallic interlocking flexible sheath 12 which gives the article its final commercial form and appearance. A bundle of 14 ¼" O. D. soft annealed copper tubes manufactured into an article of commerce such as shown at 13 of Fig. 1 has substantially the actual size shown in the drawing as to diameter and may be readily placed and shipped on reels of 5 to 8 ft. in diameter. It is quite practical to manufacture and so reel up to 400 ft. in length of the article although this is by no means a limitation but merely lends to readiness in handling.

While I have indicated the use of copper or aluminum tubing at 10 it will be understood that this is in no wise limiting as tubes of other metal as well as plastic, such as Saran, may be used for transmission of pressure impulses in measuring and controlling variables.

It is contemplated that there may be in the order of 200 ft. lengths of the article required between a control house and first point where it is desired to tap into one of the tubes of the bundle. For use at the tapping-in point, I have shown in Fig. 3 a junction box 14 somewhat similar to an electric conduit junction box. The box 14 is shown with cover removed providing access to the tubular elements. Terminations of the article 13 are joined to opposite sides of the box by conduit type fittings 14A between which the metallic sheathing 12 and wrapping 11 have been removed.

Fig. 3 indicates that one of the tubes, 15 for example, is desirably tapped off at this location. After removing the protecting sheath and wrapping from the tube bundle within the box 14, tube 15 is cut, bent at its two ends sufficiently to smooth and flare the ends and join with the compression fitting 16. Fitting 16 is a T fitting to which the tap-off branch 17 is joined prior to passing through a bulkhead type of fitting 18 to external take-off conduit 19.

To illustrate alternate, or simultaneous, uses of terminal box structure 14 at this location, I have shown tubes 20 and 21 provided with departure tubes to points of measurement or control. It is obvious, of course, that one of the tubes 20, 21 may be an exit from the bundle and the other may be an inlet to the bundle at this location. The junction box 14 may form a junction of two lengths of article 13 and, by way of example, I show a tube 22 joined to a tube 23 by means of a coupling member 24. To facilitate locating a desired tube of the twisted bundle, at any location along the article, it is practical to color-code the tubes by paint or similar method.

The conduit type fittings 14A are shown to better advantage in Fig. 4, consisting essentially of a bracket rigidly secured to junction box 13 for ready mating with another bracket which hinges therewith on one end and is secured to the other end by a bolt. The complete removability of the bracket is, of course, necessary if junction box 13 is to be arbitrarily applied to any point along the continuous length of the article.

In Fig. 2 I show a possible alternate type of protective sheath as distinguished from 12, heretofore illustrated. Braided covering 25 consists of filaments which may be of various types of metal or of plastic material. The purpose of these outer coverings is physical protection as well as setting of the degree of rigidity imparted to the article. The inner wrap 11 serves to form or shape the bundle and give a semi-resilient shield between the tough outer covering and the bundle to keep from damaging the tube elements while still allowing a certain amount of flexibility or bending. It is of course obvious that both coverings additionally serve to keep moisture and dirt from contacting the bundled elements as well as corrosive fumes and sharp or heavy objects. Finally, I do not desire to be limited to the particular materials employed for these purposes.

Under certain conditions of location and weather it may be desirable to heat the article to prevent any moisture in the transported air from condensing or to keep the fluids from freezing or solidifying. In Fig. 5 I show that one of the tube positions may be occupied by an electric heating cable 26 of the type commonly known as lead-covered and containing low heating resistance wire.

Another structure for obtaining heating of the article is shown in Fig. 6 wherein a thin-wall steel or other tube is provided among the elements of the bundle through which low pressure steam or hot fluid may be circulated for slightly raising the temperature. Should certain installations make it desirable that the temperature of the article be reduced, it is conceivable that some type of cooling fluid may be passed through tube 27.

As shown in the cross-section of Fig. 6 the wrapped tube cluster is spaced from the metallic outer cover so as to accommodate bending of the bundle and sliding movement of the interengaged tubes.

In Fig. 7 hot or cold conditions are provided for by insulation 28. Insulation 28 may be applied to the cluster body 10 as it passes through the fabricating machine, prior to receiving the covering 11, by means of an extruding head. The extruding head may be arranged to force into all of the interstices and around the tubing this compound 28 which may be one of the well known thermal insulating compounds of a semi-plastic nature. The result is the formation of a uniform outer cylindrical contour to which covering 11 may be applied.

In many of the measuring and controlling systems for which my article is designed to serve it is frequently desirable to have signal lights, bells, alarms, etc. of an electrical nature. Consequently, in Fig. 7, I indicate that electrical conductors as exemplified by 29 may be run through one of the tubes of the bundle.

I contemplate that the outer covering of the article need not be in the nature of a wrap or braid, such as 12 and 25, but may be extruded on the wrap 11 or, in fact, directly about the tubes 10. For example, the bundle may be covered by extruded material such as lead or plastic.

While I have chosen to illustrate and describe certain preferred embodiments of my invention, it will be understood that the materials used may be of considerable variety. It is only necessary that they be of what I denote as a semi-flexible type so that the complete assembled article of manufacture may be bent sufficiently for reel transportation and ready installation. It is appreciated that the rigidity, while considerable in short lengths, is not sufficient to be self-sustaining over long spans which would sag and call for support.

What I claim as new, and desire to secure by Letters Patent of the United States, is:

1. A semi-flexible tubing bundle for metering and control pressure systems, said bundle comprising a plurality of parallel, readily bendable, relatively long, small-bore, thin-wall metallic tubes having a long slow twist and slidably engaging each other throughout their lengths to form an approximately circular cluster of minimum overall diameter, a flexible insulating covering extending about the exterior of said tubes and binding the tubes together, and a flexible protective outer cover.

2. The combination of claim 1 including electric conductors threaded through at least one of the tubes.

3. The combination of claim 1 including thermal insulation material in the spaces between the tubes and underneath the flexible covering.

4. A semi-flexible tubing bundle for metering and control pressure systems, said bundle comprising a plurality of parallel, readily bendable, relatively long, small-bore, thin-wall metallic tubes having a long slow twist and slidably engaging each other throughout their lengths to form an approximately circular cluster of minimum overall diameter, an insulating covering tape wrapped about the exterior of said tubes and binding the tubes together, and a flexible outer cover formed by a metallic ribbon-like continuous strip having interlocked edges.

5. A semi-flexible tubing bundle for metering and control pressure systems, said bundle comprising a plurality of parallel, readily bendable, relatively long, small-bore, soft-annealed, thin-wall metallic tubes formed with the individual tubes from the bundle center describing a gentle helix and slidably engaging each other throughout their lengths to form an approximately circular cluster of minimum overall diameter, an insulating covering tape spirally wrapped about the exterior of said tubes and binding the tubes together, and a flexible metallic protecting cover over the wrapped tape.

6. The combination of claim 5 in which the flexible metallic protecting cover is formed of braided filaments.

CLAYTON H. BARNARD.

REFERENCES CITED

The following references are of record in the file of this patent:

UNITED STATES PATENTS

| Number | Name | Date |
| --- | --- | --- |
| 273,305 | Plankinton | Mar. 6, 1883 |
| 275,748 | Bergman | Apr. 10, 1883 |
| 524,977 | Cummings | Aug. 21, 1894 |
| 979,762 | Hildebrandt | Dec. 27, 1910 |
| 1,980,363 | Staples | Nov. 13, 1934 |
| 2,111,409 | Seaburg | Mar. 15, 1938 |
| 2,308,274 | Frederickson | Jan. 12, 1943 |
| 2,438,670 | MacDonald | Mar. 30, 1948 |

FOREIGN PATENTS

| Number | Country | Date |
| --- | --- | --- |
| 255,673 | England | July 29, 1926 |
| 601,094 | France | Feb. 22, 1926 |